(12) United States Patent
Woytowich et al.

(10) Patent No.: US 9,427,723 B2
(45) Date of Patent: *Aug. 30, 2016

(54) ABSORBENT CONTAINMENT MATS

(71) Applicant: New Pig Corporation, Tipton, PA (US)

(72) Inventors: Mark S. Woytowich, State College, PA (US); Brian Dennis Kratzer, Greer, SC (US); Dane R. Jackson, Port Matilda, PA (US)

(73) Assignee: New Pig Corporation, Tipton, PA (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/204,585

(22) Filed: Mar. 11, 2014

(65) Prior Publication Data

US 2014/0256533 A1    Sep. 11, 2014

Related U.S. Application Data

(60) Provisional application No. 61/776,091, filed on Mar. 11, 2013.

(51) Int. Cl.
| | |
|---|---|
| *B01J 20/26* | (2006.01) |
| *B01J 20/28* | (2006.01) |
| *B01J 20/30* | (2006.01) |
| *B01J 20/24* | (2006.01) |

(52) U.S. Cl.
CPC ............ *B01J 20/28035* (2013.01); *B01J 20/24* (2013.01); *B01J 20/26* (2013.01); *B01J 20/30* (2013.01); *B01J 20/3078* (2013.01)

(58) Field of Classification Search
CPC ................................. B01J 20/26; B01J 20/22
USPC .................... 502/401, 402, 439, 526, 527.24
See application file for complete search history.

(56) References Cited

U.S. PATENT DOCUMENTS

| | | |
|---|---|---|
| 3,978,274 A | 8/1976 | Blum |
| 4,285,075 A | 8/1981 | Nelson |
| 4,609,580 A | 9/1986 | Rockett et al. |
| 4,813,944 A | 3/1989 | Haney et al. |
| 6,280,840 B1 | 8/2001 | Luhmann et al. |
| 6,295,658 B1 | 10/2001 | Jenkins |
| 6,446,275 B1 | 9/2002 | Wright et al. |
| 6,756,098 B2 | 6/2004 | Zhou et al. |
| 2005/0009425 A1 | 1/2005 | Foote |
| 2007/0110950 A1 | 5/2007 | Yang |
| 2008/0299347 A1 | 12/2008 | Ukei et al. |
| 2009/0158512 A1 | 6/2009 | Stickler et al. |
| 2010/0030170 A1 | 2/2010 | Keller et al. |
| 2010/0143645 A1 | 6/2010 | Wilmsen |
| 2011/0123761 A1 | 5/2011 | Wright |
| 2011/0318548 A1 | 12/2011 | Fedeli et al. |
| 2014/0076358 A1 | 3/2014 | Irwin et al. |

OTHER PUBLICATIONS

Irwin et al., U.S. Appl. No. 61/700,926 Entitled "Fragrance Control", filed Sep. 14, 2012 and published on Mar. 20, 2014 as part of the prosecution history of U.S. Patent Application Publication No. 2014/0076358.

*Primary Examiner* — Edward Johnson
(74) *Attorney, Agent, or Firm* — Alan G. Towner, Esq.; Pietragallo Gordon Alfano Bosick & Raspanti, LLP

(57) ABSTRACT

Absorbent containment mats are disclosed. The mats include an upper absorbent layer, a lower liquid impermeable barrier layer, and a peripheral containment edge. The peripheral containment edge may have a lower profile than the absorbent layer. A pressure sensitive adhesive may be applied to the underside of the barrier layer. A durable porous layer may be provided over the absorbent layer.

21 Claims, 2 Drawing Sheets

ABSORBENT CONTAINMENT MATS

CROSS-REFERENCE TO RELATED APPLICATION

This application claims the benefit of U.S. Provisional Patent Application Ser. No. 61/776,091 filed Mar. 11, 2013, which is incorporated herein by reference.

FIELD OF THE INVENTION

The present invention relates to absorbent mats, and more particularly relates to absorbent mats for restrooms and other locations that are capable of absorbing and containing liquids.

BACKGROUND INFORMATION

Conventional absorbent mats for use on floors are capable of absorbing various types of spilled liquids. However, such mats are typically disposed of after limited periods of use and are not designed to remain in place during cleaning operations such as floor mopping. Furthermore, spilled liquids may not be sufficiently contained by conventional absorbent mats and may escape through the bottom and/or side edges of such mats.

SUMMARY OF THE INVENTION

An aspect of the present invention is to provide an absorbent containment mat comprising an absorbent layer, a peripheral containment edge surrounding at least a portion of a periphery of the absorbent layer having a liquid permeability less than a liquid permeability of the absorbent layer, and a substantially liquid impermeable barrier layer under the absorbent layer.

Another aspect of the present invention is to provide a method of making an absorbent containment mat. The method comprises consolidating a peripheral edge portion of a layer of absorbent material to form an edge having a liquid permeability less than a liquid permeability of the absorbent layer, and applying a substantially liquid impermeable barrier layer to an underside of the absorbent layer.

These and other aspects of the present invention will be more apparent from the following description.

DETAILED DESCRIPTION

The present invention provides absorbent mats for use in various locations such as restrooms, building entranceways, hallways, kitchens and the like. The absorbent mats may prevent damage to floors and surrounding areas. For example, when used in restrooms, the absorbent mats may protect against damage caused by acids in urine drips and splashes. The absorbent mats may be used beneath urinals, around toilets, beneath or in front of sinks, under hand dryers, in entranceways, etc. The absorbent mats may be designed to be left in place during cleaning operations, such as the mopping of restroom floors, and resist degradation from cleaning chemicals in mopping fluids.

In accordance with an embodiment of the invention, the absorbent mats comprise a hydrophilic absorbent top layer and a liquid impermeable bottom barrier layer. A pressure sensitive adhesive may be provided on the bottom side of the liquid impermeable bottom layer.

In certain embodiments, the absorbent layer of the mat may comprise a porous hydrophilic absorbent material that resists collapsing in thickness when wetted with liquids such as water, urine or cleaning solutions. This resistance to collapse allows the pores of the absorbent layer to remain open, which enables quicker air drying of the mat. The ability of the mats to retain their porosity inhibits bacterial growth, thus reducing offensive bacteria-caused odors. The top surface of the absorbent layer may be durable to prevent scuffing and tearing from foot traffic and mopping, or may have an additional protective layer that is porous and durable.

Since the absorbent mats are raised above floor level, they may be subject to mechanical impact stresses, e.g., during multiple mopping cycles. The edges of the mats should have sufficient integrity to avoid damage such as fraying. In certain embodiments, heat sealing the entire edge of the mat via application of thermal, ultrasonic or radio frequency energy increases the strength and integrity of the edge. The edge sealing technique may also compress the height of the peripheral edge below the height of the remainder of the mat in order to present a lower contact area with a mop during cleaning, thus reducing the mechanical stress applied to the edge during mopping. Additionally, the sealed edge may form a barrier that resists fluid escaping from the side edges of the mat.

Figure 1:
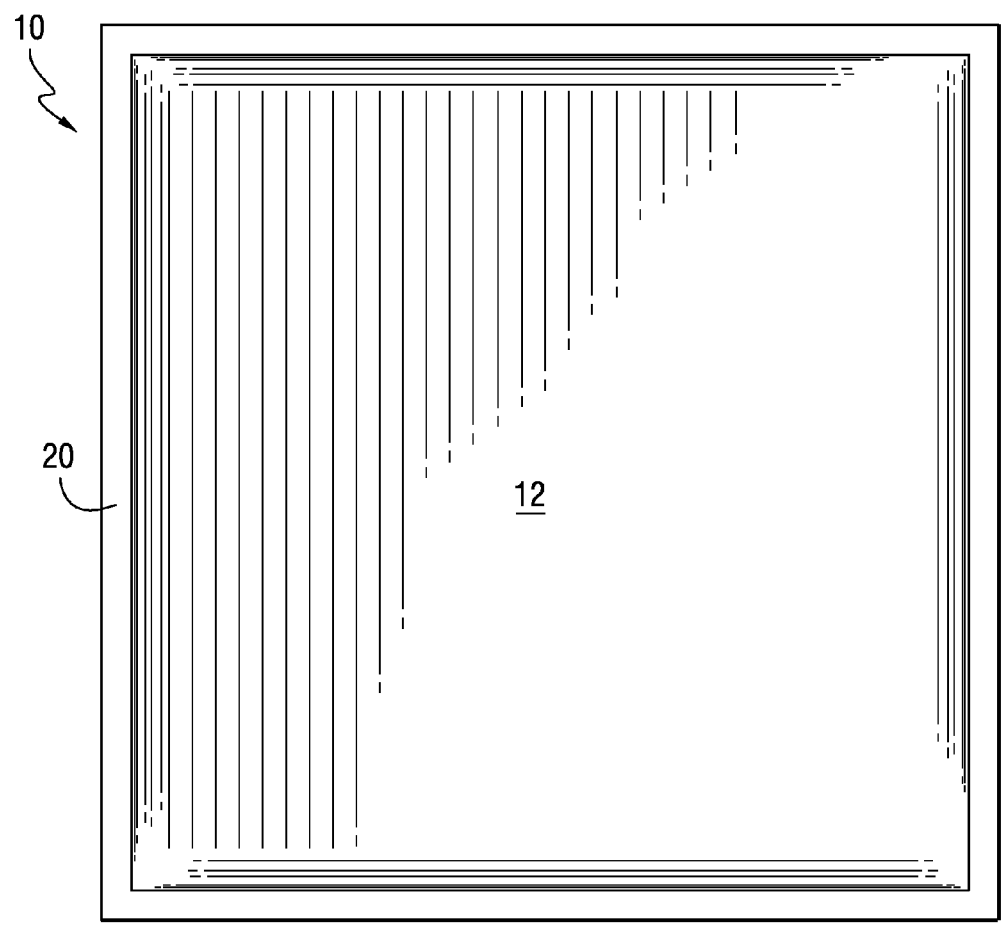
FIG. 1 is a top view of an absorbent containment mat in accordance with an embodiment of the present invention.

FIG. 1 is a top view of an absorbent containment mat 10 in accordance with an embodiment of the present invention. The absorbent containment mat 10 includes an absorbent layer 12 in its central region and a peripheral containment edge 20.

As most clearly shown in FIG. 2, the absorbent containment mat 10 includes a barrier layer 30 located below the central absorbent region 12 and the peripheral containment edge 20. In the embodiment shown, as adhesive layer 40 is used to releasably secure the absorbent containment mat 10 to a floor 5.

Figure 2:
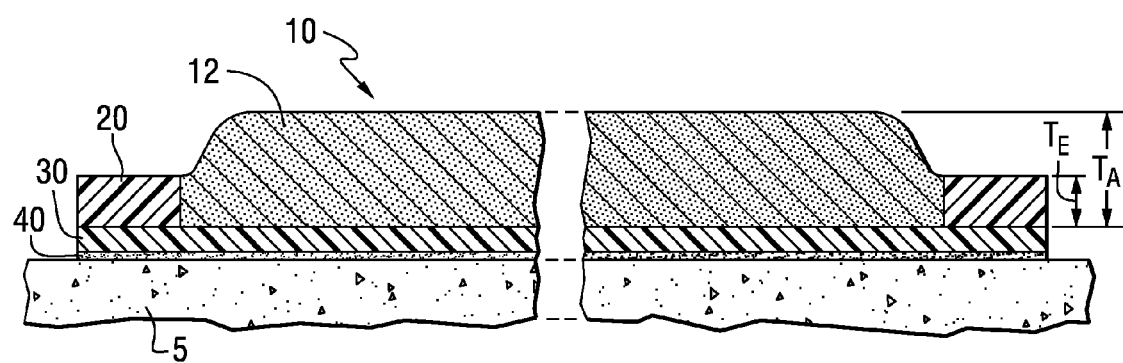
FIG. 2 is a partially schematic broken side sectional view of an absorbent containment mat adhered to a floor in accordance with an embodiment of the present invention.

As shown in FIG. 2, the height of the absorbent layer 12 is greater than the weight of the peripheral containment edge 20, i.e., the absorbent layer 12 may have a thickness $T_A$ greater than the thickness of the peripheral containment edge 20 $T_E$. The absorbent material thickness $T_A$ is typically at least 10 percent greater than the edge thickness $T_E$, for example, at least 20 or 30 percent greater. In certain embodiments, the absorbent material thickness $T_A$ is from 40 to 500 percent greater than the edge thickness $T_E$, for example, from 100 to 200 percent greater.

The thickness of the absorbent material $T_A$ may typically range from 0.1 to 2 cm, for example, from 0.12 to 1.1 cm, or from 0.13 to 0.4 cm. The thickness of the containment edge $T_E$ typically ranges from 0.02 to 0.3 cm, for example, from 0.3 to 0.25 cm, or from 0.05 to 0.18 cm. The thickness of the barrier layer 30 typically ranges from 0.01 to 0.2 mm, for example, from 0.01 to 0.15 mm, or from 0.02 to 0.06 mm.

In the embodiment shown in FIG. 2, the peripheral containment edge 20 has a generally rectangular cross section. However, other cross-sectional shapes may be used such as rounded, triangular, angled or the like. For example, the peripheral edge may have an upper surface that slopes downwardly in a straight or curved line from its inner portion next to the absorbent layer 12 toward its outermost peripheral portion. In this case, the height of the peripheral edge next to the absorbent layer 12 may be the same or less than the thickness $T_A$ of the absorbent layer 12, and the height of the peripheral edge at its outermost portion may range from zero to a height less than the thickness $T_A$ of the absorbent layer 12.

The width of each peripheral containment edge 20 may typically range from 0.2 to 4 cm, for example, from 0.4 to 1.5 cm. In the embodiment shown in FIG. 1, the peripheral containment edge 20 surrounds the entire central absorbent layer 12. As more fully described below, in certain embodiments, the peripheral containment edge 20 may be formed by consolidating material located at edge portions of the absorbent layer 12 to thereby reduce or eliminate porosity of the peripheral containment edge 20.

In certain embodiments, the overall length and width of the absorbent containment mat 10 may be selected as desired. For example, the length may range from 0.3 to 20 meters, and the width may range from 0.1 to 2 meters. In certain embodiments, the length may range from 0.3 to 2 meters, and the width may range from 0.15 to 1.5 meters. Although the absorbent containment mat 10 shown in FIG. 1 is square, any other desired shape may be provided, such as rectangular, round, oval and the like. In addition, portions of the mat may be cut out, e.g., to fit around bathroom fixtures such as urinals, toilets, sinks and the like.

The absorbent layer 12 may have an open pore structure in which water and other liquids may pass through and be retained in the absorbent layer. In certain embodiments, the absorbent layer 12 retains some or all of its loft when exposed to liquids. The absorbent layer 12 may comprise a single layer or multiple layers, in which case each layer may be made of the same or different material.

In certain embodiments, the absorbent layer 12 may be made of absorbent materials such as meltblown, needlepunch, stitchbond, hydroentangle and chemically bonded fibers. For example, the absorbent layer 12 may be made of a hydrophilic material such as polyester, nylon, rayon, pulp, cotton, surfactant treated polypropylene and the like. For example, surfactant treated polypropylene meltblown and/or polyester needlepunch hydrophilic materials may be used.

The peripheral containment edge 20 may be made of any suitable material such as thermoplastics. Examples of thermoplastic materials include polypropylene, polyethylene, polyvinyl chloride, polyester, polyethylene terephthalate (PET) and the like. These can be mixed with non-thermoplastic materials, such as cotton, rayon, pulp and the like. For example, the edge materials may include polypropylene meltblown and/or polypropylene spunbond.

The barrier layer 30 may be made of any suitable substantially liquid impermeable material such as polypropylene film, polyester film, polyethane film, polyvinyl chloride film or the like. For example, the barrier layer 30 may comprise polyethylene and/or polypropylene film. The barrier layer 30 may have any desired thickness, for example, from 0.01 to 0.15 mm, or from 0.02 to 0.06 mm.

The adhesive layer 40 may be made of any known base material such as acrylic, urethane, rubber alloys or the like. For example, the adhesive layer 40 may comprise a pressure sensitive adhesive such as cross linked acrylic or urethane that allows the absorbent containment mat 10 to be removed from a particular location. The floor-contacting adhesive 40 resists mat displacement, e.g., caused by foot traffic and mopping action, and may be resistant to common cleaning chemicals used during the cleaning of restrooms, such as ionic and non-ionic surfactants, quaternary ammonium compounds, mild organic solvents, and mineral dissolving acids. The pressure sensitive adhesive 40 may cover the entire bottom surface of the absorbent mat 10 in order to seal out fluids and keep them from migrating underneath the mat or otherwise escaping from the mat. Fluid migrating beneath the mat may promote bacterial growth that produces offensive odors.

Figure 3:
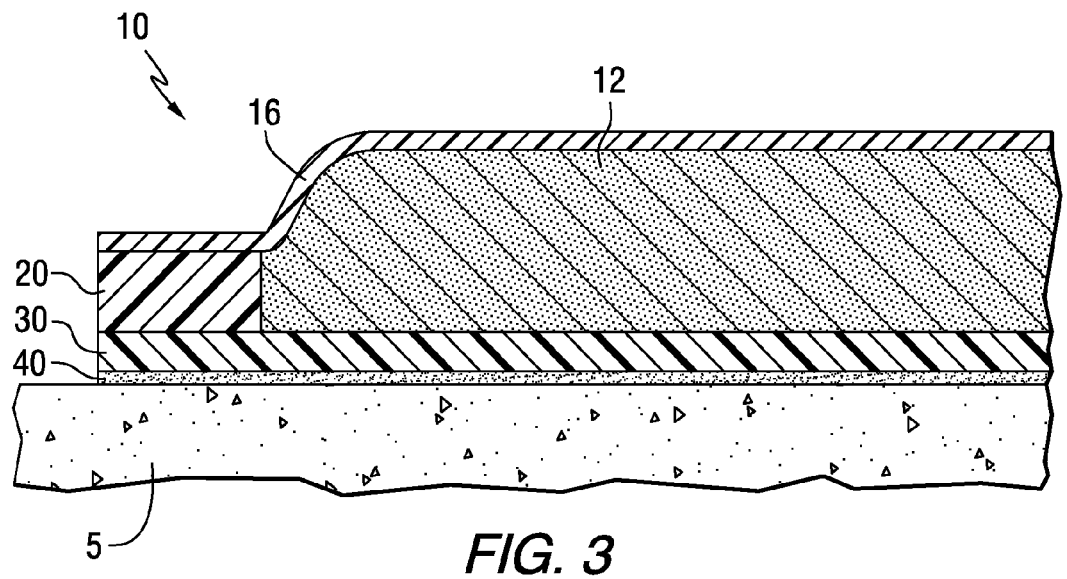
FIG. 3 is a partially schematic side view of a portion of an absorbent containment mat adhered to a floor in accordance with another embodiment of the present invention.

FIG. 3 illustrates an embodiment of an absorbent containment mat 10 similar to the embodiment shown in FIG. 2, with the addition of an upper protective layer 16 covering the absorbent layer 12 and, optionally, covering the peripheral containment edge 20. The durable protective layer 16 may be attached to the absorbent layer 12 via thermal, ultrasonic, radio frequency, adhesive or mechanical bonding, such as stitch bonding. The protective layer 16 may typically comprise a liquid permeable material such as polypropylene spunbond nonwoven, polyester spunbond, hydroentangled rayon or polyester, woven fabrics and the like. For example, polypropylene spunbond nonwoven may be particularly suitable for many applications. The thickness of the protective layer 16 may typically range from 0.05 to 0.7 mm, for example, from 0.1 to 0.25 mm.

Figure 4:
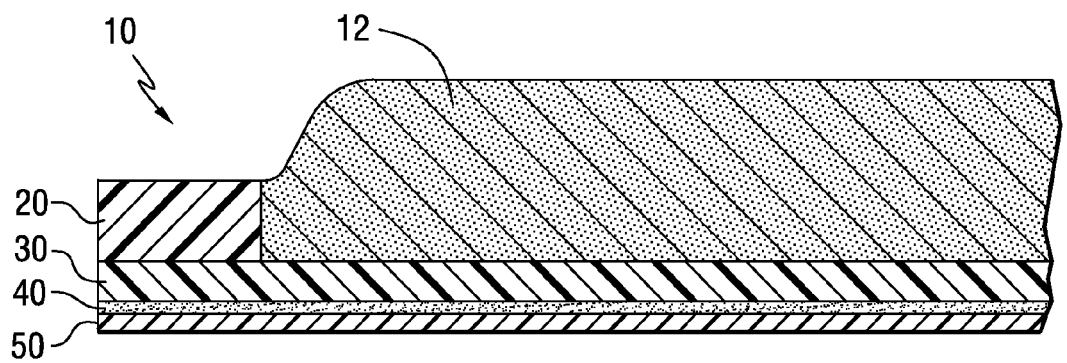
FIG. 4 is a partially schematic side view of a portion of an absorbent containment mat in accordance with an embodiment of the present invention.

FIG. 4 illustrates the absorbent containment mat 10 prior to its installation onto a floor or other surface. The mat 10 includes a layer of release material 50 covering the adhesive layer 40 prior to installation. The release layer 50 may be made of any suitable material such as silicone coated paper, wax coated paper, polyethylene film or the like.

The absorbent mats may be any suitable color such as non-white, gray, beige or blue, in order to conceal any fluid staining of the top surface of the mat. In contrast, a white or lightly colored mat may readily show urine stains which can result in the absorbent mat being replaced before the end of its useful life. The mats may also have fragrances, odor neutralizers and sanitizers to mask, eliminate or reduce offensive odors thus prolonging the mat's useful life.

In certain embodiments, the peripheral containment edge 20 is formed by consolidating the outer edge of the absorbent layer 12. Such consolidation may be performed by techniques such as the application of radio frequency or ultrasonic energy to the edge, by sewing or stitching the edge, or by the addition of an adhesive or other pore-filling material to the edge. The adhesive may be any suitable adhesive known to those skilled in the art, including adhesives that may be infiltrated in liquid form into the porous edges of the adhesive layer 12 followed by curing and/or solidifying.

In certain embodiments, the absorbent mats may be edge sealed, e.g., by the application of radio frequency or ultrasonic energy to the edges, and die cut to shape in a one-step operation, e.g., using an articulated RF/die cutting tool. The removable release liner 50 may be applied against the adhesive layer 40 of the absorbent mat prior to the RF/die cutting process to prevent adhesion of the adhesive layer 40 to other mats when stacked for packaging and transportation. Alternately, an absorbent mat with an integrated top release surface, such as described in U.S. Patent Application Publication No. US 2011/0318548, which is incorporated herein by reference, may be used without a release liner except for the one absorbent mat on the bottom of a stack where the adhesive layer is exposed.

Whereas particular embodiments of this invention have been described above for purposes of illustration, it will be evident to those skilled in the art that numerous variations of the details of the present invention may be made without departing from the invention as defined in the appended claims.

What is claimed is:

1. An absorbent containment mat comprising:
   an absorbent layer;
   a peripheral containment edge surrounding at least a portion of a periphery of the absorbent layer having a liquid permeability less than a liquid permeability of the absorbent layer, wherein the peripheral containment edge comprises a portion of the absorbent layer that has been consolidated; and
   a substantially liquid impermeable barrier layer under the absorbent layer.

2. The absorbent containment mat of claim 1, wherein the absorbent layer has a height greater than a height of the peripheral containment edge.

3. The absorbent containment mat of claim 2, wherein the height of the absorbent layer is at least 40 percent greater than the height of the peripheral containment edge.

4. The absorbent containment mat of claim 1, wherein the consolidated portion is formed by heating the portion of the absorbent layer.

5. The absorbent containment mat of claim 4, wherein the heating is performed by applying radio frequency or ultrasonic energy to the portion of the absorbent layer.

6. The absorbent containment mat of claim 4, wherein the consolidated portion is fowled by applying pressure to the portion of the absorbent layer.

7. The absorbent containment mat of claim 1, wherein the peripheral containment edge comprises at least one material selected from polypropylene, polyester, polyethylene and polyvinyl chloride.

8. The absorbent containment mat of claim 1, wherein the absorbent layer comprises at least one hydrophilic material selected from polyester, rayon, cotton, pulp and surfactant treated polypropylene.

9. The absorbent containment mat of claim 1, wherein the barrier layer comprises at least one material selected from polypropylene, polyethylene, polyethylene terephthalate and polyvinyl chloride.

10. The absorbent containment mat of claim 1, further comprising an adhesive layer under the barrier layer.

11. The absorbent containment mat of claim 10, wherein the adhesive layer is coextensive with the barrier layer.

12. The absorbent containment mat of claim 10, wherein the adhesive layer comprises a pressure sensitive adhesive.

13. The absorbent containment mat of claim 10, further comprising a release sheet covering the adhesive layer.

14. The absorbent containment mat of claim 1, further comprising a protective layer over at least a portion of the absorbent layer.

15. The absorbent containment mat of claim 14, wherein the protective layer comprises a porous material selected from polypropylene film, polyethylene film, polyester film and polyvinyl chloride film.

16. A method of making an absorbent containment mat comprising:
    consolidating a peripheral edge portion of a layer of absorbent material to form an edge having a liquid permeability less than a liquid permeability of the absorbent layer; and
    applying a substantially liquid impermeable barrier layer to an underside of the absorbent layer to thereby produce an absorbent containment mat according to claim 1.

17. The method of claim 16, wherein the peripheral edge is consolidated by heating.

18. The method of claim 16, wherein the peripheral edge is consolidated by applying radio frequency energy or ultrasonic energy to the peripheral edge.

19. The method of claim 16, wherein the peripheral edge is consolidated by stitching and/or sewing the peripheral edge.

20. The method of claim 16, wherein the peripheral edge is consolidated by applying adhesive to the peripheral edge.

21. An absorbent containment mat comprising:
    an absorbent layer;
    a peripheral containment edge surrounding at least a portion of a periphery of the absorbent layer having a liquid permeability less than a liquid permeability of the absorbent layer;
    a substantially liquid impermeable barrier layer under the absorbent layer; and
    a pressure sensitive adhesive under the barrier layer.

* * * * *